United States Patent
Anderson et al.

(10) Patent No.: US 12,410,750 B1
(45) Date of Patent: Sep. 9, 2025

(54) SHIELDED SWIRL GAS TURBINE ENGINE INLET ANTI-ICING SYSTEM

(71) Applicant: HONEYWELL INTERNATIONAL INC., Charlotte, NC (US)

(72) Inventors: Morris G. Anderson, Phoenix, AZ (US); Matthew Dunn, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/958,264

(22) Filed: Nov. 25, 2024

(51) Int. Cl.
*F02C 7/047* (2006.01)
*B64D 33/02* (2006.01)

(52) U.S. Cl.
CPC ...... *F02C 7/047* (2013.01); *B64D 2033/0233* (2013.01)

(58) Field of Classification Search
CPC . F02C 7/047; B64D 2033/0233; B64D 15/04; B64D 15/02
See application file for complete search history.

(56) References Cited

U.S. PATENT DOCUMENTS

| | | | |
|---|---|---|---|
| 4,482,114 A * | 11/1984 | Gupta | B64D 15/02 244/134 B |
| 5,011,098 A * | 4/1991 | McLaren | B64D 27/14 244/134 B |
| 6,688,558 B2 | 2/2004 | Breer et al. | |
| 8,413,930 B2 | 4/2013 | Gregory et al. | |
| 9,488,067 B2 | 11/2016 | Johnson et al. | |
| 9,950,799 B2 | 4/2018 | Anderson et al. | |
| 10,458,275 B2 | 10/2019 | Chilukuri | |
| 11,084,600 B2 | 8/2021 | Laly | |
| 2010/0163678 A1 * | 7/2010 | Gregory | B64D 15/04 244/134 B |
| 2011/0011981 A1 * | 1/2011 | Vauchel | F02C 7/047 244/134 B |
| 2011/0108662 A1 * | 5/2011 | Diochon | B64D 15/04 244/54 |
| 2016/0257418 A1 * | 9/2016 | Caruel | B64D 15/04 |
| 2017/0058772 A1 * | 3/2017 | Frank | B64D 33/02 |
| 2017/0210475 A1 * | 7/2017 | Wiberg | B64D 29/00 |
| 2017/0259926 A1 * | 9/2017 | Anderson | B64D 15/04 |
| 2020/0346764 A1 * | 11/2020 | Kestler | B64D 29/00 |

* cited by examiner

*Primary Examiner* — Gerald L Sung
(74) *Attorney, Agent, or Firm* — Ingrassia Fisher & Lorenz, LLP

(57) ABSTRACT

A gas turbine engine inlet anti-ice system includes a nacelle having an inlet lip, an anti-ice air supply duct, and a flow deflector. The inlet lip has an annular anti-icing chamber formed therein that is defined by an inner surface of the inlet lip and an aft wall that has an aft wall opening formed therein. The anti-ice air supply duct is configured to direct a flow of pressurized air into the aft wall opening. The flow deflector is coupled to the aft wall and extends over the aft wall opening. The flow deflector has an inner surface, an outer surface, a closed end, and an open end. The flow deflector and aft wall define a flow channel that extends between the closed end and the open end and in a direction that is tangential to the aft wall opening.

14 Claims, 6 Drawing Sheets

SHIELDED SWIRL GAS TURBINE ENGINE INLET ANTI-ICING SYSTEM

TECHNICAL FIELD

The present disclosure generally relates to gas turbine engine inlet anti-ice systems, and more particularly to a shielded swirl inlet anti-ice system with a flow deflector and thermal stress reduction configuration.

BACKGROUND

Aircraft operate in many different types of weather and conditions, including icing conditions. Operation in icing conditions can cause ice to form on the leading edge of the nacelle that houses the aircraft engine. This ice may, at times, break off and enter the engine, potentially resulting in undesirable issues. In addition, the ice may adversely affect air flow into the engine, potentially resulting in reduced performance and/or negatively impacting operating margins of the aircraft.

In light of the above, gas turbine engine inlet anti-icing systems have been developed to address ice formation. Although presently known anti-icing systems are generally effective, various challenges remain, particularly with respect to airflow efficiency, thermal stresses, asymmetric or uneven heating, localized hot spots, weight, complex geometries, tight tolerances, which can all contribute to cost.

Hence, there is a need for a gas turbine engine inlet anti-icing system that does not adversely impact airflow efficiency, that reduces thermal stresses, that reduces asymmetric or uneven heating and/or localized hot spots, and that is relatively noncomplex and relatively less costly. The present disclosure addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a gas turbine engine inlet anti-ice system includes a nacelle having an inlet lip, an anti-ice air supply duct, and a flow deflector. The inlet lip has an annular anti-icing chamber formed therein that is defined by an inner surface of the inlet lip and an aft wall that is coupled to the inner surface. The aft wall has an aft wall opening formed therein. The anti-ice air supply duct is coupled to the aft wall opening and is configured to receive a flow of pressurized air and to direct the flow of pressurized air into the aft wall opening. The flow deflector is coupled to the aft wall and extends over the aft wall opening. The flow deflector has an inner surface, an outer surface, a closed end, and an open end. At least a portion of the inner surface is spaced apart from the aft wall opening and, together with the aft wall, defines a flow channel that extends between the closed end and the open end and in a direction that is tangential to the aft wall opening.

In another embodiment, a gas turbine engine system includes a gas turbine engine, a nacelle, an anti-ice air supply duct, and a flow deflector. The nacelle houses the gas turbine engine and has an inlet lip. The inlet lip has an annular anti-icing chamber formed therein that is defined by an inner surface of the inlet lip and an aft wall coupled to the inner surface. The aft wall has an aft wall opening formed therein. The anti-ice air supply duct is coupled to the aft wall opening and is configured to receive a flow of pressurized air and to direct the flow of pressurized air into the aft wall opening. The flow deflector is coupled to the aft wall and extends over the aft wall opening. The flow deflector has an inner surface, an outer surface, a closed end, and an open end. At least a portion of the inner surface is spaced apart from the aft wall opening and, together with the aft wall, defines a flow channel that extends between the closed end and the open end and in a direction that is tangential to the aft wall opening.

In yet another embodiment, a gas turbine engine inlet anti-ice system includes a nacelle having an inlet lip, an anti-ice air supply duct, an annular shield, and a plurality of flexible brackets. The inlet lip has an annular anti-icing chamber formed therein that is defined by an inner surface of the inlet lip and an aft wall that is coupled to the inner surface. The aft wall has an aft wall opening formed therein. The anti-ice air supply duct is coupled to the aft wall opening and is configured to receive a flow of pressurized air and to direct the flow of pressurized air into the aft wall opening. The annular shield is disposed within the annular anti-icing chamber and has a first end and a second end. The first end is spaced a first predetermined distance from the aft wall, and the second end is spaced a second predetermined distance from the aft wall. Each flexible bracket is spaced radially apart from two other flexible brackets and is coupled between the first end of the annular shield and the aft wall. The second predetermined distance is greater than the first predetermined distance, the annular shield divides the annular anti-icing chamber into a first chamber portion and a second chamber portion, and the first chamber portion and the second chamber portion are fluidly coupled together by a passage formed between the second end and the inner surface of the inlet lip.

Furthermore, other desirable features and characteristics of the gas turbine engine inlet anti-ice system will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
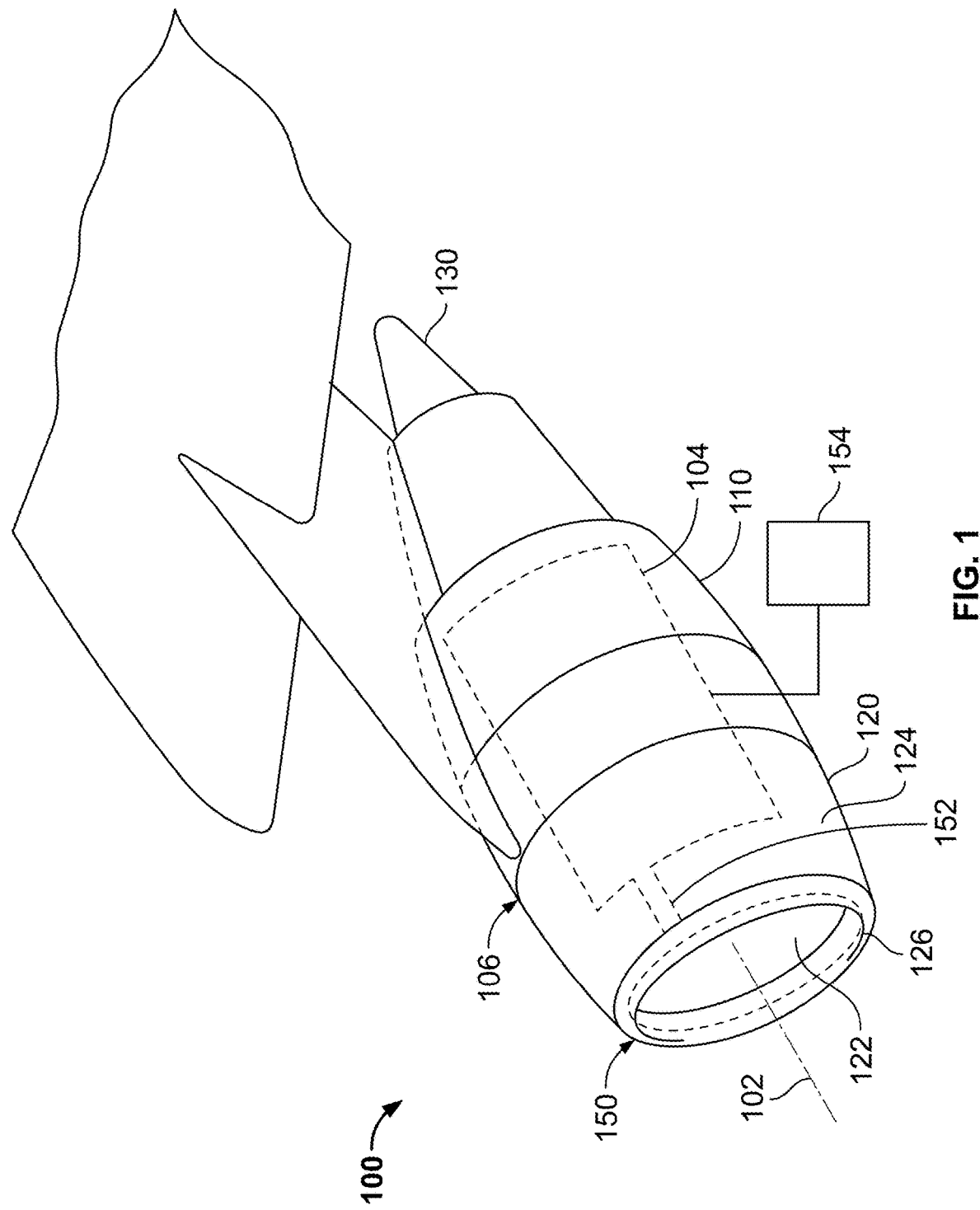
FIG. 1 depicts a partial schematic representation of one embodiment of an aircraft engine assembly.

Referring first to FIG. 1, a partial schematic representation of an aircraft engine assembly 100 in accordance with an exemplary embodiment is depicted. As shown, the aircraft engine assembly 100 is generally mounted on an aircraft, such as on an aircraft wing or on an aircraft fuselage. In the description below, the aircraft engine assembly 100 may be described with respect to an annular or cylindrical coordinate system with radial, axial, and tangential orientations relative to a centerline 102. However, it is noted that aspects of the engine or the overall engine assembly 100 may not be axisymmetric.

The aircraft engine assembly 100 includes an engine 104 (schematically shown) housed in a nacelle 106. The nacelle 106 has an annular shape and may be formed by a number of sections or components, including a cowl section 110, an inlet cowl section 120, and an exhaust cowl section 130. The inlet cowl section 120 may be formed by an inner section 122, an outer section 124, and an inlet lip 126. The outer section 124 circumscribes the inner section 122, and the inlet lip 126 joins the inner section 122 to the outer section 124 to form the leading edge of the aircraft engine assembly 100. Generally, the inlet cowl section 120 defines an inlet opening for directing air into the engine 104. At least a portion of the air entering the engine assembly 100 is combusted by the engine 104 to convert a portion of the energy from the fuel to rotational energy, causing the turbine to rotate, which forces air through the engine. The resulting products are forcibly exhausted through an exhaust opening(s) at least partially defined by the exhaust cowl section 130. The force associated with this exhausted gas is called thrust.

As shown, the inlet lip 126 is the leading edge of the engine assembly 100. During some weather or operating conditions, ice may form and accumulate on the inlet lip 126 and, if unaddressed, may cause undesirable issues. As such, an inlet anti-icing system 150 is incorporated into the aircraft engine assembly 100 to prevent formation of ice and/or to remove formed ice (collectively referenced below as "anti-icing") from the inlet lip 126.

As described in greater detail below, the inlet anti-icing system 150 circulates heated, pressurized air in a manner that increases the temperature of portions of the inlet lip 126 that may otherwise be susceptible to icing. The pressurized air, which is typically bleed air supplied from a particular stage of the engine 104, may be supplied to the inlet anti-icing system 150 from the engine 104 via an anti-ice air supply duct 152. In one exemplary embodiment, operation of the inlet anti-icing system 150 may be controlled by a controller 154 based on weather conditions, operating conditions, and/or operator commands as a stand-alone system or as part of a larger aircraft safety system. Although not shown, other components, such as flow valves and conduits, may also be incorporated into the aircraft engine assembly 100 to facilitate efficient and effective operation of the inlet anti-icing system 150. One example embodiment of the inlet anti-icing system 150 will now be described in greater detail.

Figure 2:
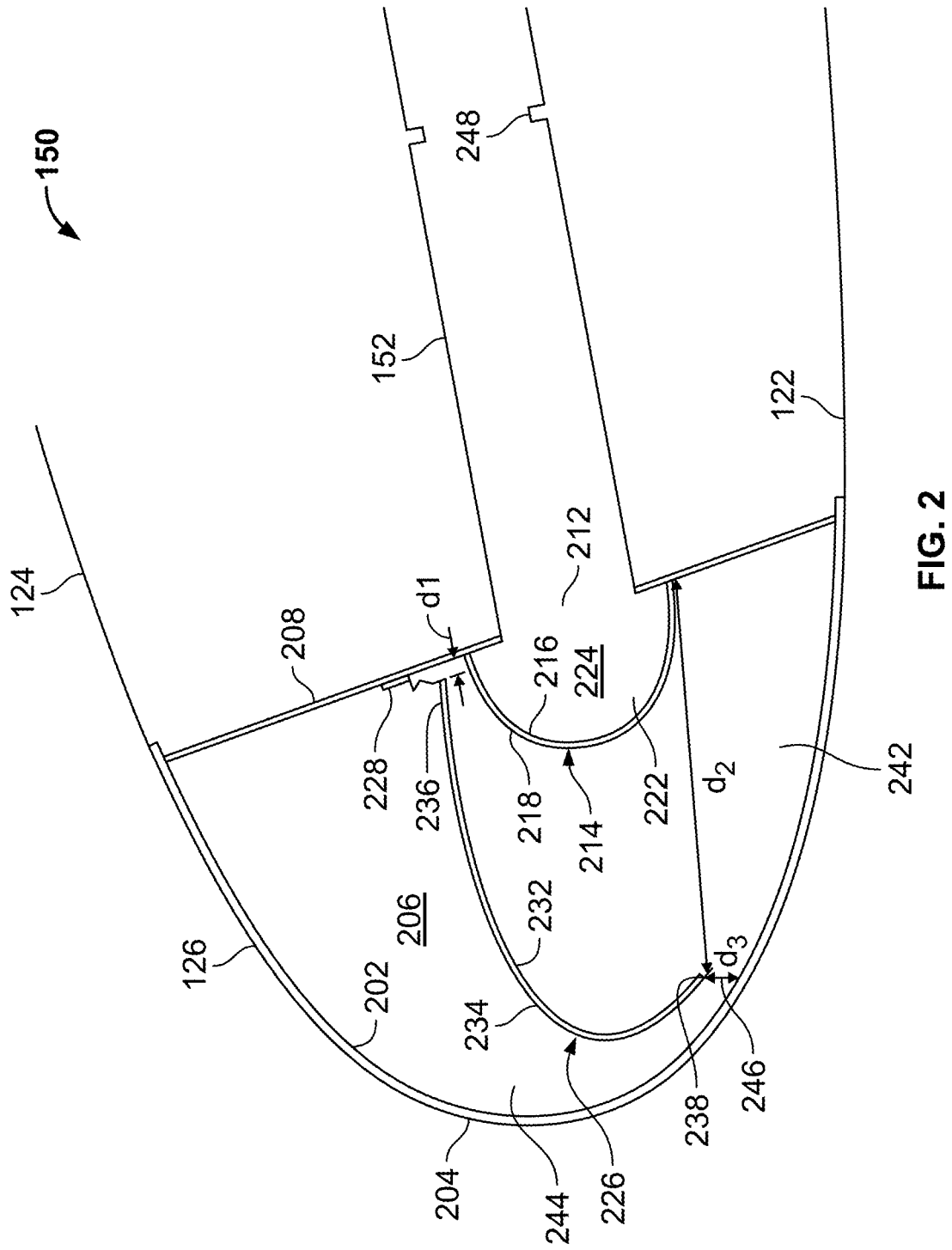
FIG. 2 depicts a cross-sectional view of a portion of one embodiment of an inlet anti-icing system in the axial-radial plane that may be implemented in the example aircraft engine assembly of FIG. 1.

Referring now to FIG. 2, a cross-sectional view of a portion of the inlet anti-icing system 150 in the axial-radial plane is depicted. As shown, the inlet lip 126 includes an inner surface 202 and an outer surface 204, and has an annular anti-icing chamber 206 formed therein. The annular anti-icing chamber 206 is defined by the inner surface 202 of the inlet lip 126 and an aft wall 208 that is coupled to the inner surface 202 and, given its cross-sectional shape, the annular anti-icing chamber 206 may be referred to as a D-shaped chamber or D-shaped duct.

In the depicted embodiment, it is seen that the aft wall 208 extends in a generally radial direction between the edges of the inlet lip 126 and has an aft wall opening 212 formed therein. It will be appreciated that in other embodiments the aft wall 208 may extend between the inner and outer sections 122, 124 or between the one end of the inlet lip 126 and the opposing inner or outer section 122, 124. Moreover, although FIG. 2 depicts the aft wall 208 as a unitary structure, the aft wall 208 may be formed by any number of components that, together with the inner surface 202 function to define the annular anti-icing chamber 206. Regardless of its specific configuration, it is seen that the aft wall opening 212 is coupled to the anti-ice air supply duct 152, which receives the flow of pressurized air and directs the flow of pressurized air into the aft wall opening 212.

Figure 3:
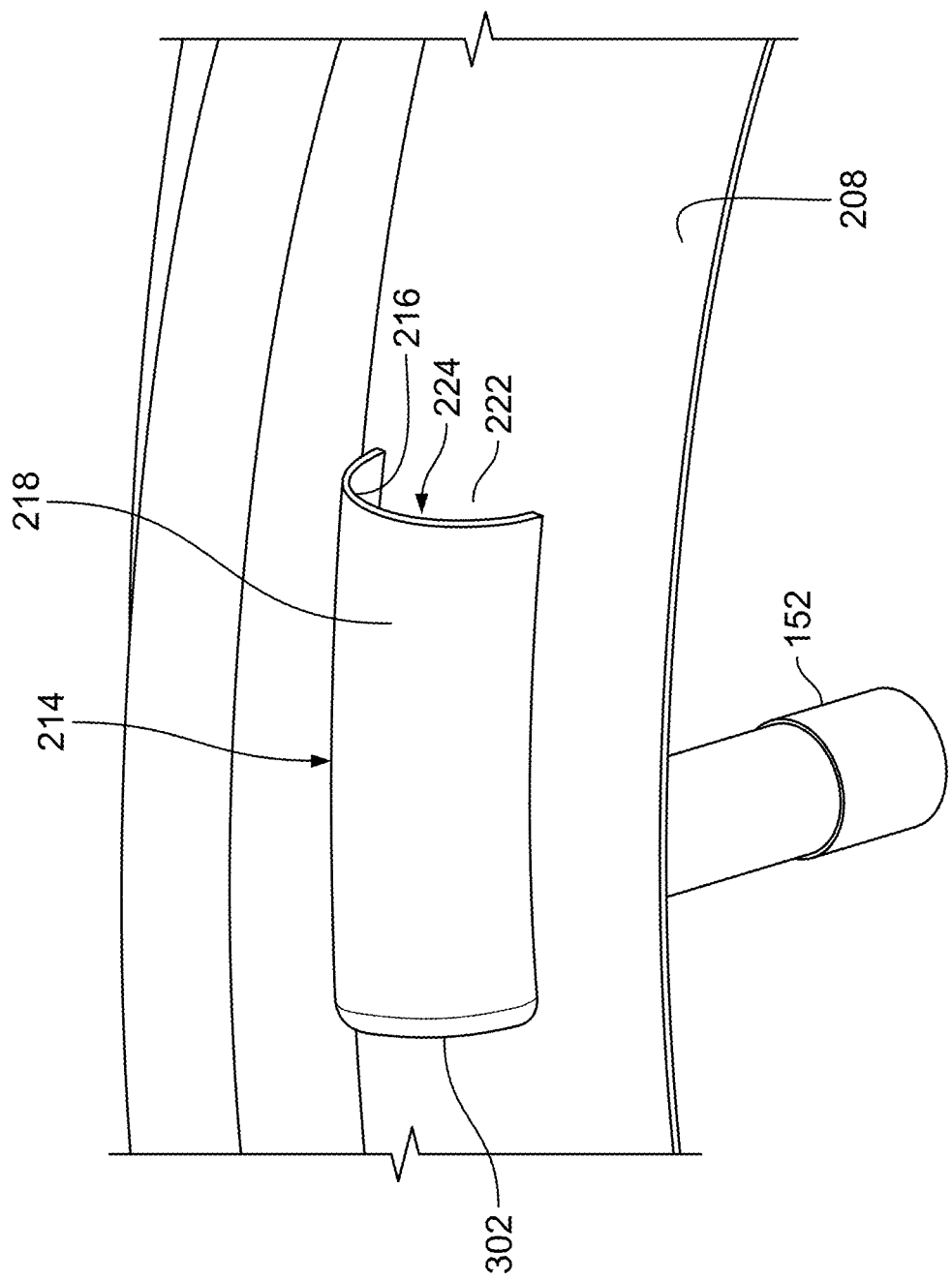
FIG. 3 depicts a close-up plan view of one embodiment of a flow deflector that may be included in the inlet anti-icing system of FIG. 2.

As FIG. 2 also depicts, a flow deflector 214 is coupled to the aft wall 208 and extends over the aft wall opening 212. The flow deflector 214 includes an inner surface 216, an outer surface 218, an open end 222, and, as seen more clearly in FIG. 3, a closed end 302. At least a portion of the inner surface 216 is spaced apart from the aft wall opening 212 and, together with the aft wall 208, defines a flow channel 224. The flow channel 224 extends between the closed end 302 and the open end 222 and in a direction that is tangential to the aft wall opening 212. The flow deflector 214, which is a relatively simple low-blockage deflector, allows replacement of the relatively complex nozzle (e.g., piccolo tube) that is used in many known inlet anti-ice systems to inject tangential flow. The flow deflector 214 also does not require tight tolerances to meet design goals.

Figure 4:
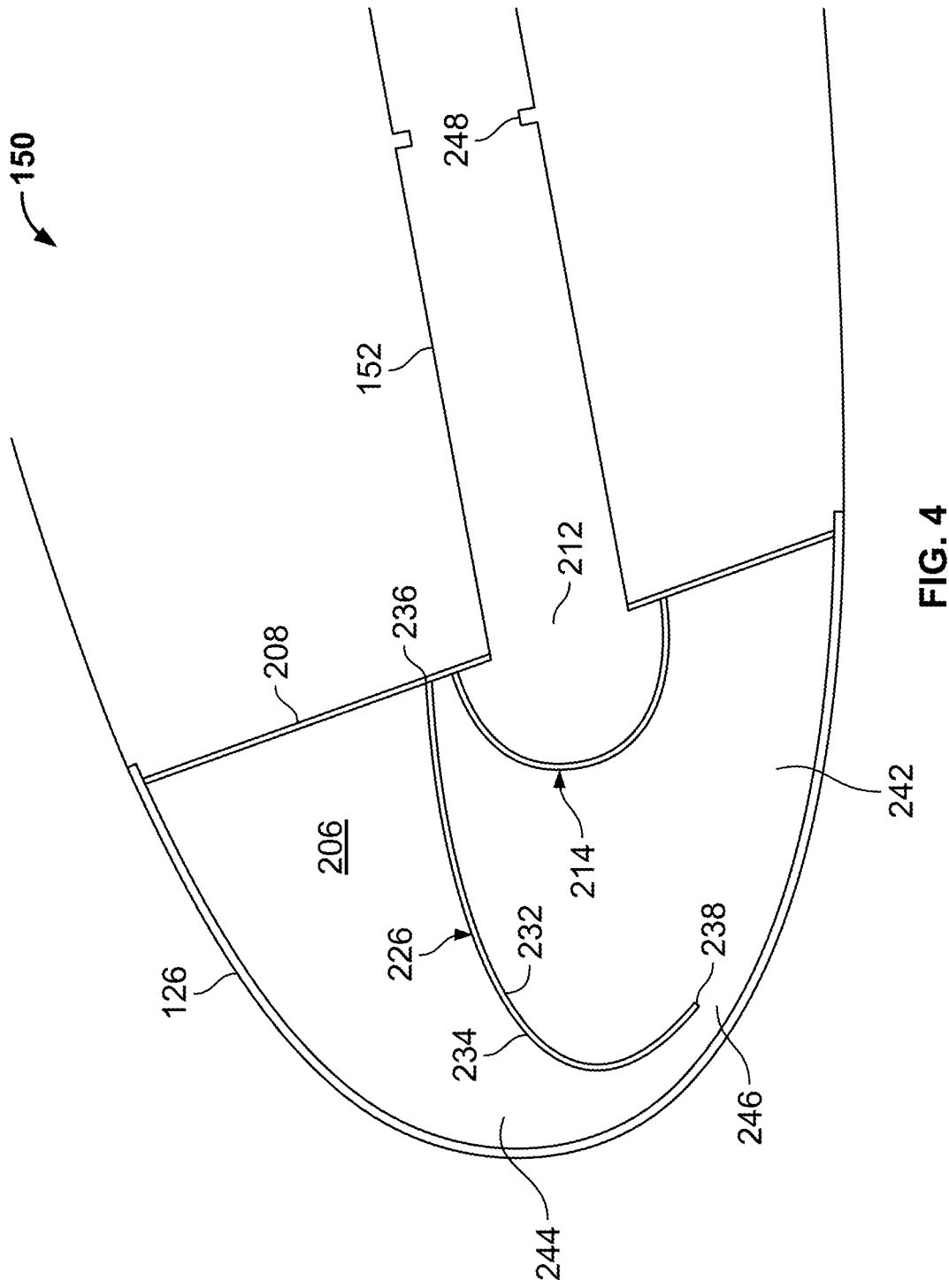
FIG. 4 depicts a cross-sectional view of a portion of another embodiment of an inlet anti-icing system in the axial-radial plane that may be implemented in the example aircraft engine assembly of FIG. 1.

As FIG. 2 also depicts, the inlet anti-icing system 150 may additionally include an annular shield 226. The annular shield 226, when included, may be coupled to the aft wall 208 via a plurality of flexible brackets 228, as depicted in FIG. 2 (only one flexible bracket visible in FIG. 2), or it may be coupled directly to the aft wall 208, as depicted in FIG. 4. In both instances, the annular shield 226 is disposed within the annular anti-icing chamber 206, at least partially surrounds the flow deflector 214, and has an inner surface 232, an outer surface 234, a first end 236, and a second end 238. In the embodiment depicted in FIG. 2, the first end 236 is spaced a first predetermined distance (d1) from the aft wall 208, and the second end 238 is spaced a second predetermined distance (d2) from the aft wall 208. As is readily seen in FIG. 2, the second predetermined distance (d2) is greater than the first predetermined distance (d1).

Continuing with FIG. 2, it is noted that each of the flexible brackets 228 is spaced radially apart from two other flexible brackets 228, and each is coupled between the first end 236 of the annular shield 226 and the aft wall 208. Thus, as is more clearly depicted in FIG. 5, except at the positions where the flexible brackets 228 are coupled between the annular shield 226 and the aft wall 208, a gap 502 of the first predetermined distance (d1) will exist between the first end 236 of the annular shield 226 and the aft wall 208. It will be appreciated that the flexible brackets 228 may be constructed of any one of numerous materials. Some non-limiting examples include titanium and inconel. No matter the specific material used, the flexible brackets 228 reduce any thermal stress that may be generated during operation of the inlet anti-ice system 150, and most specifically during initial start-up of the inlet anti-ice system 150, when the annular shield 226 and aft wall 208 may not be at the same temperature and may undergo different thermal expansions.

In both embodiments, the annular shield 226 divides the annular anti-icing chamber 206 into a first chamber portion 242 and a second chamber portion 244. The first chamber portion 242 includes the portions of the annular anti-icing chamber 206 between the inner surface 232 of the annular shield 226 and the aft wall 208, and the second chamber portion 244 includes the portions of the annular anti-icing chamber 206 between the outer surface 234 of the annular shield 226 and the inlet lip 126. Generally, the first chamber portion 242 is positioned, relative to the second chamber portion 244, rearward in an axial dimension and inward in a radial dimension. The first and second chamber portions 242, 244 are fluidly coupled together by an annular passage or slot 246 that is formed between the second end 238 of the annular shield 226 and the inlet lip 126. In the embodiment depicted in FIGS. 2 and 5, the first and second chamber portions 242, 244 are also fluidly coupled together via the gap 502.

The flow deflector 214 and annular shield 226 are positioned such that the flow of pressurized air, upon exiting the aft wall opening 212, is redirected in a direction that is generally tangential to the aft wall opening 212 and into the first chamber portion 242. With this configuration, the flow deflector 214 and annular shield 226 prevent any impingement of the pressurized air directly from the aft wall opening 212 onto the inlet lip 126. Typically, the pressurized air flowing into the first chamber portion 242 has annular swirling flow characteristics about the first chamber portion 242. As the pressurized air flows along the first chamber portion 242, some amount of pressurized air flows through the annular passage or slot 246 into the second chamber portion 244. In the second chamber portion 244, the pressurized air functions to increase the temperature of the inlet lip 126 to prevent and/or mitigate the formation of ice and/or assist in the removal of formed ice. At this point, the heated air has been mixed and/or cooled so as to provide a more uniform and/or effective heating of the inlet lip 126.

Figure 6:
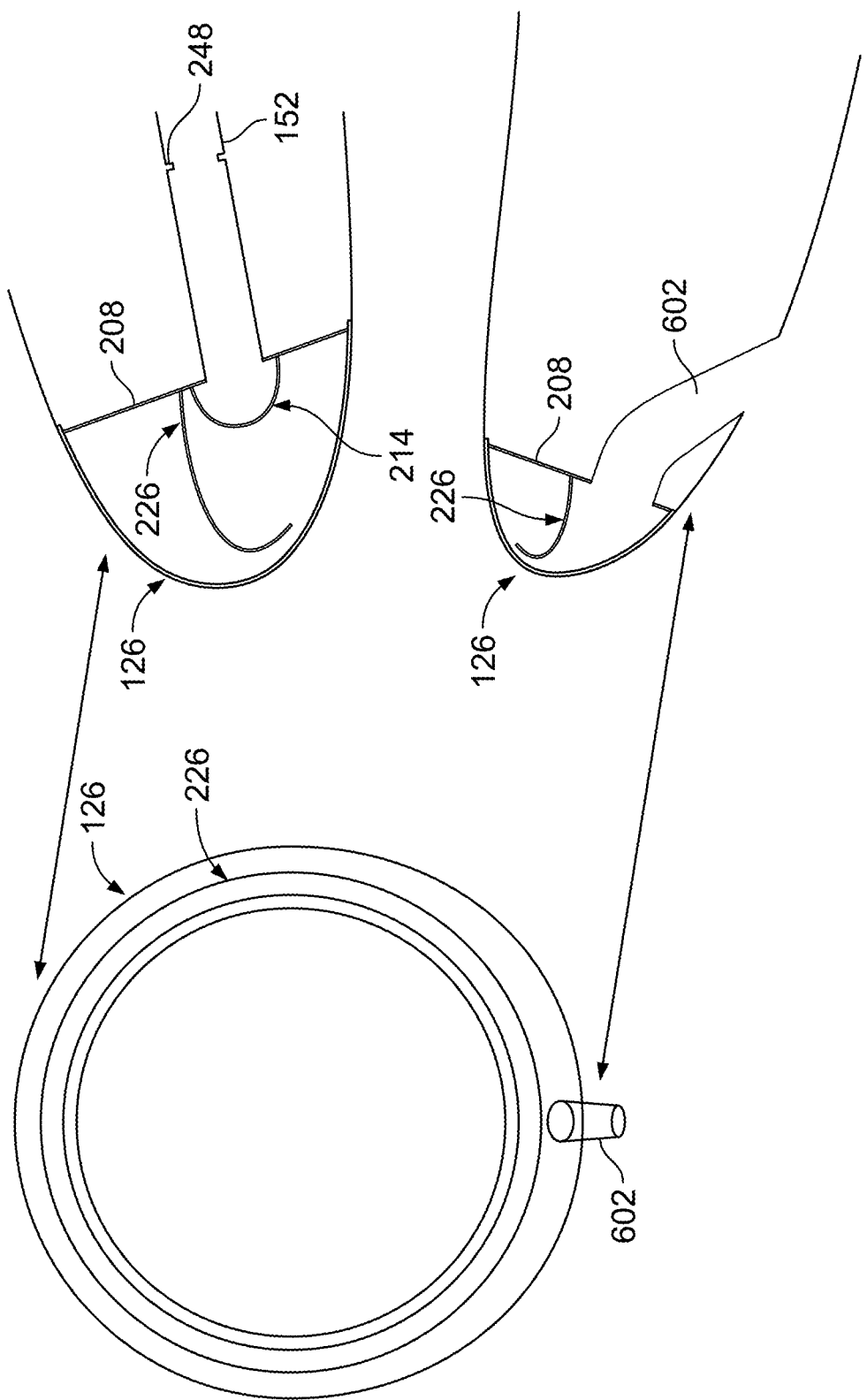
FIG. 6 depicts a front end view of an inlet lip for a gas turbine engine and corresponding cross-sectional views of different portions of the inlet anti-icing system in the axial-radial plane that may be implemented in the example aircraft engine assembly of FIG. 1.

As may be appreciated, the swirling anti-icing bleed air gradually moves into the second chamber portion 244 via the gap 502, providing anti-icing protection to the external portion of the lip. The bleed air then exits the annular anti-icing chamber 206 via an exhaust port 602 (see FIG. 6).

The annular shield 226 may have any suitable shape, position, and dimension to improve the flow characteristics and the overall effectiveness and efficiency of the inlet anti-icing system 150. In one exemplary embodiment, the cross-sectional area (and volume) of the first chamber portion 242 is approximately equal to the cross-sectional area (and volume) of the second chamber portion 244. As further examples, the first distance (d1), the second distance (d2), and a third distance (d3) may be sized to provide the desired flow characteristics. Generally, the first distance (d1), the second distance (d2), and the third distance (d3), as well as various other dimensions, such as various relative geometric dimensions (e.g., annular passage or slot 246 to first chamber portion 242 size, volume ratio of first chamber portion 242 to second chamber portion 244, and the like), may be defined using CFD analyses.

Figure 5:
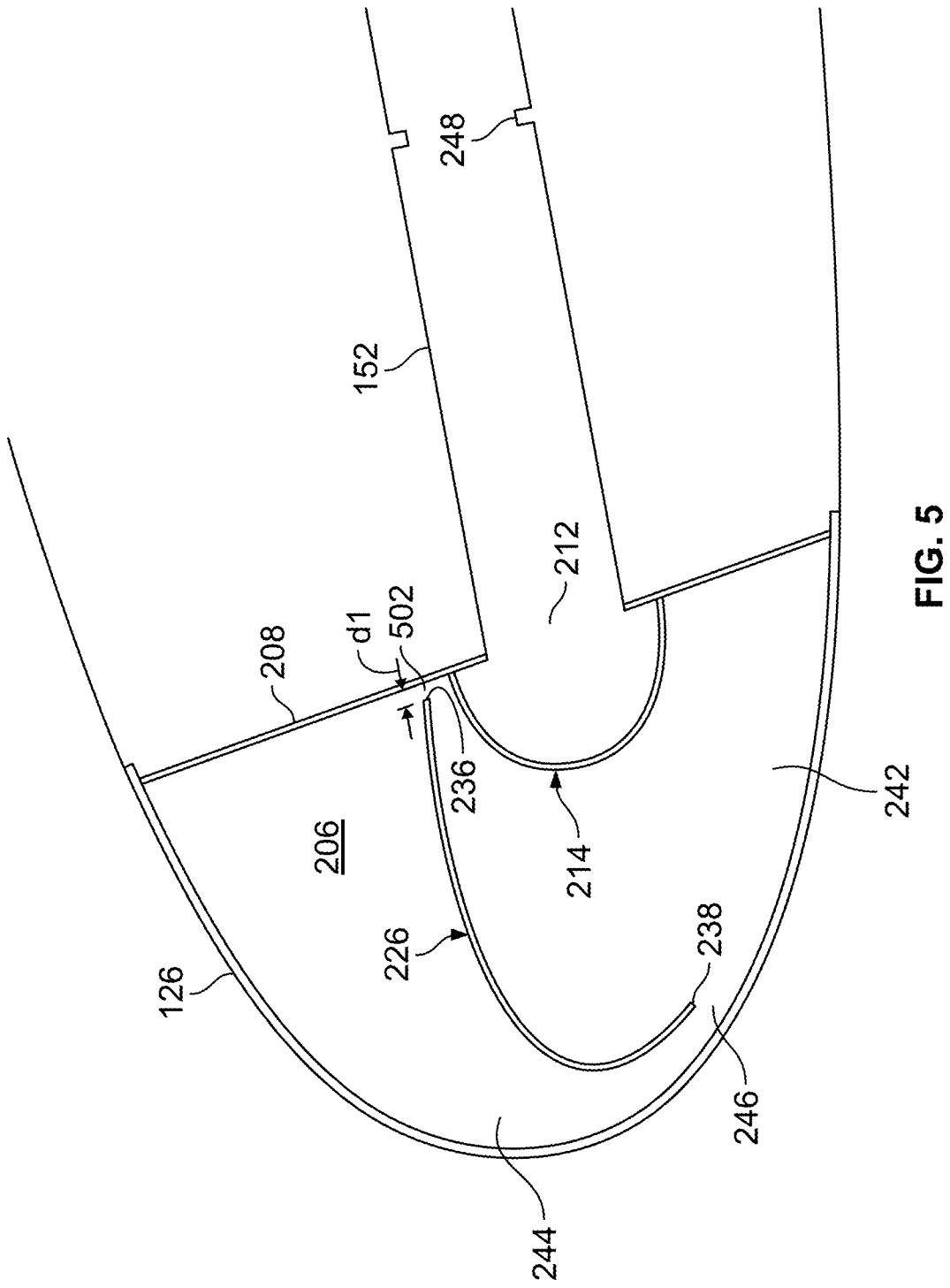
FIG. 5 depicts another cross-sectional view of the inlet anti-icing system of FIG. 2.

As FIGS. 2, 4, and 5 also depict, the inlet anti-icing system 150 may also include a metering orifice 248. The metering orifice 248, when included, is disposed within the anti-ice air supply duct 152 and is configured to meter the flow of pressurized air that is directed into the aft wall opening 212. By incorporating the metering orifice 248, variations in the metering of the flow of pressurized air can be readily implemented simply by changing the size/dimensions of the metering orifice 248.

The inlet anti-icing system 150 described herein does not adversely impact airflow efficiency. However, it does reduce thermal stresses, reduces asymmetric or uneven heating and/or localized hot spots, and is relatively noncomplex and relatively less costly than presently known systems. It also allows the inlet lip 126 to be constructed of a relatively lightweight material, such as aluminum, which can reduce overall weight and further reduce cost.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine inlet anti-ice system, comprising:
a nacelle having an inlet lip, the inlet lip having an annular anti-icing chamber formed therein, the annular anti-icing chamber defined by an inner surface of the inlet lip and an aft wall coupled to the inner surface, the aft wall having an aft wall opening formed therein;
an anti-ice air supply duct coupled to the aft wall opening, the anti-ice air supply duct configured to receive a flow of pressurized air and direct the flow of pressurized air into the aft wall opening;
a flow deflector coupled to the aft wall and extending over the aft wall opening, the flow deflector having an inner surface, an outer surface, a closed end, and an open end, at least a portion of the inner surface spaced apart from the aft wall opening and, together with the aft wall, defining a flow channel that extends between the closed end and the open end and in a direction that is tangential to the aft wall opening;
an annular shield disposed within the annular anti-icing chamber and at least partially surrounding the flow deflector, the annular shield having a first end and a second end, the first end spaced a first predetermined distance from the aft wall, the second end spaced a second predetermined distance from the aft wall; and
a plurality of flexible brackets, each flexible bracket spaced radially apart from two other flexible brackets and coupled between the first end of the annular shield and the aft wall,
wherein:
the second predetermined distance is greater than the first predetermined distance,
the annular shield divides the annular anti-icing chamber into a first chamber portion and a second chamber portion, and
the first chamber portion and the second chamber portion are fluidly coupled together by a passage formed between the second end and the inner surface of the inlet lip.

2. The system of claim 1, wherein:
the annular shield further includes an inner surface and an outer surface,
the first chamber portion is defined between at least the inner surface and the aft wall; and
the second chamber portion is defined between the outer surface and the inner surface of the inlet lip.

3. The system of claim 1, wherein:
the first end of the annular shield being spaced the first predetermined distance from the aft wall defines a gap, having the first predetermined distance, between the annular shield and the aft wall at positions where the flexible brackets are not coupled to the annular shield and the aft wall.

4. The system of claim 3, wherein the first chamber portion and the second chamber portion are also fluidly coupled together via the gap.

5. The system of claim 1, further comprising:
a metering orifice disposed within the anti-ice air supply duct and configured to meter the flow of pressurized air directed into the aft wall opening.

6. The system of claim 1, further comprising:
a flow deflector coupled to the aft wall and extending over the aft wall opening, the flow deflector disposed within the first chamber portion and having an inner surface, an outer surface, a closed end, and an open end, at least a portion of the inner surface spaced apart from the aft wall opening and, together with the aft wall, defining a flow channel that extends between the closed end and the open end and in a direction that is tangential to the aft wall opening.

7. A gas turbine engine system, comprising:
a gas turbine engine;
a nacelle housing the gas turbine engine and having an inlet lip, the inlet lip having an annular anti-icing chamber formed therein, the annular anti-icing chamber defined by an inner surface of the inlet lip and an aft wall coupled to the inner surface, the aft wall having an aft wall opening formed therein;
an anti-ice air supply duct coupled to the aft wall opening, the anti-ice air supply duct coupled to receive a flow of pressurized air from the gas turbine engine and direct the flow of pressurized air into the aft wall opening;
a flow deflector coupled to the aft wall and extending over the aft wall opening, the flow deflector having an inner surface, an outer surface, a closed end, and an open end, at least a portion of the inner surface spaced apart from the aft wall opening and, together with the aft wall, defining a flow channel that extends between the closed end and the open end and in a direction that is tangential to the aft wall opening;
an annular shield disposed within the annular anti-icing chamber and at least partially surrounding the flow deflector, the annular shield having a first end and a second end, the first end spaced a first predetermined distance from the aft wall, the second end spaced a second predetermined distance from the aft wall; and
a plurality of flexible brackets, each flexible bracket spaced radially apart from two other flexible brackets and coupled between the first end of the annular shield and the aft wall,
wherein:
the second predetermined distance is greater than the first predetermined distance,
the annular shield divides the annular anti-icing chamber into a first chamber portion and a second chamber portion, and
the first chamber portion and the second chamber portion are fluidly coupled together by a passage formed between the second end and the inner surface of the inlet lip.

8. The system of claim 7, wherein:
the annular shield further includes an inner surface and an outer surface,
the first chamber portion is defined between at least the inner surface and the aft wall; and
the second chamber portion is defined between the outer surface and the inner surface of the inlet lip.

9. The system of claim 7, wherein:
the first end of the annular shield being spaced the first predetermined distance from the aft wall defines a gap, having the first predetermined distance, between the annular shield and the aft wall at positions where the flexible brackets are not coupled to the annular shield and the aft wall.

10. The system of claim 9, wherein the first chamber portion and the second chamber portion are also fluidly coupled together via the gap.

11. The system of claim 7, further comprising:
a metering orifice disposed within the anti-ice air supply duct and configured to meter the flow of pressurized air directed into the aft wall opening.

12. A gas turbine engine inlet anti-ice system, comprising:
a nacelle having an inlet lip, the inlet lip having an annular anti-icing chamber formed therein, the annular anti-icing chamber defined by an inner surface of the inlet lip and an aft wall coupled to the inner surface, the aft wall having an aft wall opening formed therein;

an anti-ice air supply duct coupled to the aft wall opening, the anti-ice air supply duct configured to receive a flow of pressurized air and direct the flow of pressurized air into the aft wall opening; and an annular shield disposed within the annular anti-icing chamber and having a first end and a second end, the first end spaced a first predetermined distance from the aft wall, the second end spaced a second predetermined distance from the aft wall; and a plurality of flexible brackets, each flexible bracket spaced radially apart from two other flexible brackets and coupled between the first end of the annular shield and the aft wall, wherein:
the second predetermined distance is greater than the first predetermined distance, the annular shield divides the annular anti-icing chamber into a first chamber portion and a second chamber portion, and the first chamber portion and the second chamber portion are fluidly coupled together by a passage formed between the second end and the inner surface of the inlet lip.

13. The system of claim 12, wherein:
the annular shield further includes an inner surface and an outer surface, the first chamber portion is defined between at least the inner surface and the aft wall;

the second chamber portion is defined between the outer surface and the inner surface of the inlet lip;

the first end of the annular shield being spaced the first predetermined distance from the aft wall defines a gap, having the first predetermined distance, between the annular shield and the aft wall at positions where the flexible brackets are not coupled to the annular shield and the aft wall; and the first chamber portion and the second chamber portion are also fluidly coupled together via the gap.

14. The system of claim 12, further comprising:
a metering orifice disposed within the anti-ice air supply duct and configured to meter the flow of pressurized air directed into the aft wall opening.

* * * * *